Feb. 26, 1957  S. S. HARRIS  2,782,553
FISHING TACKLE BELT
Filed Feb. 17, 1955
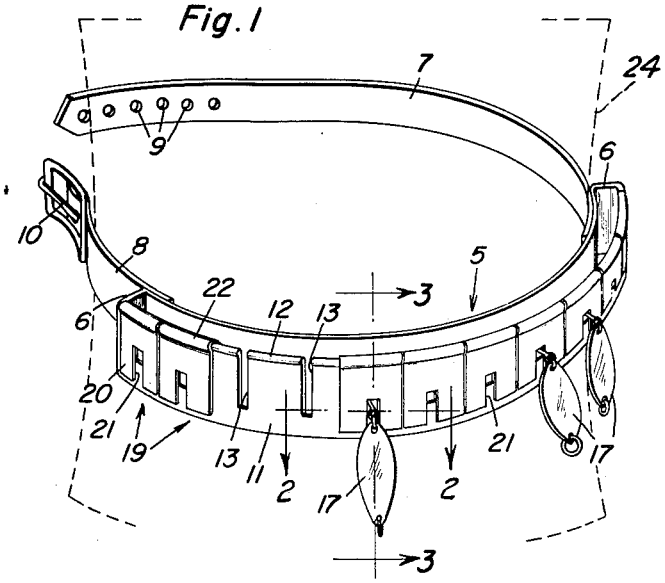
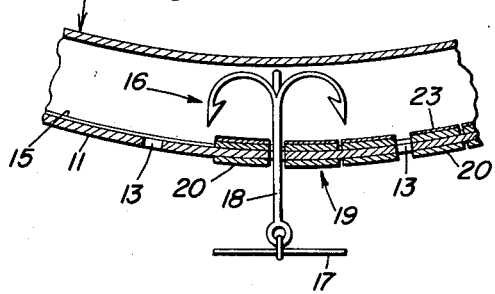
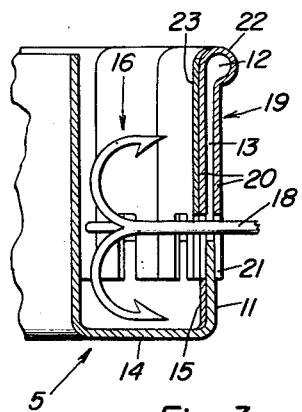
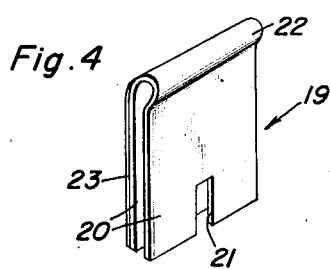
Stanley S. Harris
INVENTOR.

...

United States Patent Office 2,782,553
Patented Feb. 26, 1957

2,782,553

FISHING TACKLE BELT

Stanley S. Harris, Culver, Oreg.

Application February 17, 1955, Serial No. 488,769

5 Claims. (Cl. 43—57.5)

The present invention relates to a tackle belt particularly for lure fishermen, and has for its primary object to provide, in a manner as hereinafter set forth, novel means for securely holding a variety of lures in a position to facilitate selection and convenient for immediate use.

Another very important object of the invention is to provide a fishermen's tackle belt of the aforementioned character which will substantially enclose and shield the barbed points of the lure hooks in a manner to positively prevent injuring the fingers and hand thereon.

Other objects of the invention are to provide a fishing tackle belt of the character described which will be comparatively simple in construction, strong, durable, compact, light in weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a fishing tackle belt constructed in accordance with the present invention;

Figure 2 is a fragmentary view in horizontal section through an intermediate portion of the device, taken substantially on the line 2—2 of Figure 1;

Figure 3 is a cross-sectional view, taken substantially on the line 3—3 of Figure 1; and Figure 4 is a detail view in perspective of one of the retaining clips.

Referring now to the drawing in detail, it will be seen that the embodiment of the invention which has been illustrated comprises an arcuate channel member or bar of suitable material which is designated generally by reference character 5. The channel bar 5 is closed at its ends, as at 6. Mounted on the end portions of the channel bar 5 are body encircling straps 7 and 8, the former having its free end portion provided with spaced openings 9 for receiving a suitable adjusting buckle 10 on said strap 8.

The outer or front wall 11 of the channel bar 5 is provided on its upper edge with an integral bead 12. The front wall 11 of the channel bar 5 is further provided, at spaced points, with vertical slots 13 extending downwardly thereinto from the upper edge thereof and terminating in spaced relation to the bottom or bight portion 14 of said channel bar. A protective liner 15 of suitable material (see Figure 3) is provided on the inner face of the front wall 11 of the channel bar 5 below the slots 13.

The channel bar 5, which is open at its top, is for the reception of the usual hooks 16 of the lures 17 to be held by the device, the slots 13 accommodating the shanks 18 of said hooks.

Substantially U-shaped, resilient clips 19 of suitable material are slidably and removably mounted on the front wall 11 of the channel bar 5 for retaining the hooks 16 in the slots 13. Toward this end, the legs 20 of the clips 19 have formed in their free end portions vertical slots 21 for registry with the slots 13 and which define, in conjunction therewith, openings for the passage of the hook shanks 18. The bight portions of the clips 19 are formed to provide loops 22 for the reception of the bead 12 for releasably securing said clips in position on the wall 11. Protective liners 23 for the points of the hooks 16 are provided on the inner legs of the clips 19.

It is thought that the manner in which the device is used will be readily apparent from a consideration of the foregoing. Briefly, the channel bar 5 is secured circumferentially around the body, as indicated at 24, approximately at the waist line through the medium of the flexible straps 7 and 8. To mount the lures 17 on the holder, the barbed ends or heads of the hooks are inserted downwardly in the channel bar 5 with the shanks 18 of said hooks passing through the slots 13. The resilient clips 19 are then slipped downwardly on the front wall 11 of the channel bar 5, the slotted or bifurcated legs 20 of said clips straddling the hook shanks 18. The bead 12 of the channel bar 5 snaps into the loops 22 for firmly but releasably securing the clips in position. The construction and arrangement, it will be observed, is such that the lures are clearly displayed for quick selection and removal. It also will be noted that the pointed or barbed ends of the hooks are housed within the channel bar 5. Of course, to remove a selected lure for use, the respective clip 19 is removed for opening the slot 13.

Since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A fishing tackle belt for mounting on a human body, said belt comprising: a channel bar for the reception of fishhooks, means for mounting said channel bar on the body, said channel bar including a front wall having slots therein accommodating the shanks of the hooks, and means for removably securing the shanks in the slots.

2. A fishing tackle belt for mounting on a human body, said belt comprising: a channel bar for the reception of fishhooks, means for mounting said channel bar on the body, said channel bar including a front wall and having slots therein accommodating the shanks of the hooks, and means for removably securing the shanks in the slots, the last named means comprising resilient clips adapted to be mounted on the channel bar for closing the slots.

3. A fishing tackle belt for mounting on a human body, said belt comprising: a channel bar for the reception of fishhooks, means for mounting said channel bar on the body, said channel bar including a front wall and having slots therein accommodating the shanks of the hooks, and means for removably securing the shanks in the slots, the last named means comprising resilient clips adapted to be mounted on the channel bar for closing the slots, said clips straddling the hook shanks and having slots therein communicating with the first named slots.

4. A fishing tackle belt of the character described comprising: a channel bar for the reception of fishhooks, one of the walls of said channel bar including a bead on its upper edge, said one wall having spaced slots therein for the passage of the hook shanks, and clips removably mounted on said one wall for closing the slots and retaining the hook shanks therein, said clips being substantially U-shaped and including loops on the bight portions thereof for the reception of the bead, said clips having slots in the free end portions of the legs thereof for the reception of the hook shanks.

5. A fishing tackle belt for mounting on a human body, said belt comprising: an arcuate channel bar for the reception of fishhooks, straps on the end portions of the bar for securing said bar in position on the body, said bar including a front wall having vertical slots extending downwardly thereinto from the other edge thereof for the passage of the hook shanks, and substantially U-shaped, resilient clips removably mounted on said front wall for closing the slots.

References Cited in the file of this patent

UNITED STATES PATENTS

| | | |
|---|---|---|
| 312,085 | Claghorn | Feb. 10, 1885 |
| 881,757 | Winsor | Mar. 10, 1908 |
| 1,133,542 | Deal | Mar. 30, 1915 |
| 2,292,709 | McCann | Aug. 11, 1942 |